(12) United States Patent
Reisman

(10) Patent No.: US 7,350,071 B1
(45) Date of Patent: Mar. 25, 2008

(54) ENCRYPTED AND NON-ENCRYPTED COMMUNICATION OF MESSAGE DATA

(75) Inventor: Arthur Reisman, New Albany, OH (US)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/435,736

(22) Filed: Nov. 8, 1999

(51) Int. Cl.
*H04L 9/00* (2006.01)
*G06F 15/16* (2006.01)

(52) U.S. Cl. .......................... 713/151; 713/160; 726/3; 726/14; 380/30; 705/67; 705/75; 705/76

(58) Field of Classification Search ................ 713/151, 713/160, 166, 200, 201; 380/30; 705/67, 705/75–76; 726/3, 14
See application file for complete search history.

(56) References Cited

U.S. PATENT DOCUMENTS

| | | | | |
|---|---|---|---|---|
| 5,303,303 A * | 4/1994 | White | .......................... | 713/160 |
| 5,671,279 A * | 9/1997 | Elgamal | ....................... | 705/79 |
| 5,727,156 A * | 3/1998 | Herr-Hoyman et al. | ..... | 709/219 |
| 5,729,594 A * | 3/1998 | Klingman | ................ | 379/93.12 |
| 5,773,741 A * | 6/1998 | Eller et al. | .................... | 84/609 |
| 5,774,650 A * | 6/1998 | Chapman et al. | ........... | 713/200 |
| 5,923,885 A * | 7/1999 | Johnson et al. | ............. | 717/176 |
| 5,978,840 A * | 11/1999 | Nguyen et al. | ............. | 709/217 |
| 6,041,316 A * | 3/2000 | Allen | .......................... | 705/52 |
| 6,052,710 A * | 4/2000 | Saliba et al. | ................ | 709/203 |
| 6,070,149 A * | 5/2000 | Tavor et al. | ................... | 705/26 |
| 6,105,012 A * | 8/2000 | Chang et al. | ................ | 705/64 |
| 6,144,848 A * | 11/2000 | Walsh et al. | ................. | 455/419 |
| 6,516,416 B2 * | 2/2003 | Gregg et al. | ................ | 713/201 |
| 6,529,885 B1 * | 3/2003 | Johnson | ....................... | 705/64 |
| 6,568,595 B1 * | 5/2003 | Russell et al. | ......... | 235/462.01 |
| 6,589,290 B1 * | 7/2003 | Maxwell et al. | ............ | 715/507 |
| 6,598,031 B1 * | 7/2003 | Ice | ............................... | 705/50 |
| 6,615,226 B1 * | 9/2003 | Hartman et al. | ............ | 715/505 |
| 6,629,135 B1 * | 9/2003 | Ross et al. | ................... | 709/218 |
| 6,675,153 B1 * | 1/2004 | Cook et al. | ................... | 705/74 |
| 6,772,333 B1 * | 8/2004 | Brendel | ...................... | 713/153 |
| 2001/0039579 A1 * | 11/2001 | Trcka et al. | ................ | 709/224 |

OTHER PUBLICATIONS

Schneier, Apllied cryptography, 1996, second edition, pp. 28-29.*
Copeland et al. , "Automating the Small Purchase Solicitation Cycle for Non-EDI Trading Partners Using Internet Technologies", SIGCPR 97, pp. 62-69.*
Rubinovitz, "Issues '95-Electronic Commerce", 1995, pp. 2-6.*

* cited by examiner

*Primary Examiner*—Gilberto Barrón, Jr.
*Assistant Examiner*—Minh Dieu Nguyen
(74) *Attorney, Agent, or Firm*—Sheridan Ross P.C.

(57) ABSTRACT

A first datum of a message is communicated from a first computing device to a second computing device with encryption of the first datum. A second datum of the message is communicated from the first computing device to the second computing device without encryption of the second datum. In one example, the second computing device communicates information to the first computing device responsive to a request from the first computing device to the second computing device. The information includes a procedure that causes the first computing device to select the first datum for encrypted communication to the second computing device and select the second datum for non-encrypted communication to the second computing device.

41 Claims, 2 Drawing Sheets

124

ENCRYPTED AND NON-ENCRYPTED COMMUNICATION OF MESSAGE DATA

TECHNICAL FIELD

This invention relates generally to data communications and more particularly to encrypted communication of data.

BACKGROUND OF THE INVENTION

For encrypted communication of data across the Internet, such as in a commercial context, a user on a client usually logs into a Web page of a Web site having security features. Secure communication of the data entails encryption of all the characters from the Web page. When the user types or inputs data to the Web page, an encryption algorithm is typically employed to process every character. In addition, many or all the characters from the Web page are commonly related by subject or transaction. So, the client often tries to group all the data together for communication of the data. In one example, the data can be transmitted in a same packet and/or as part of a same message. After receiving the encrypted data from the client, the server then performs decryption of the data.

However, only a subset of the characters input to a Web page usually comprises sensitive or confidential information. One example of confidential information comprises a social security number or credit card number. The confidential information is encrypted to provide security to the user in the communication or transaction. As one disadvantage, such a configuration consumes processing capacity of the client in encrypting non-confidential data in addition to confidential data. Undesirably, this encryption of the non-confidential data non-productively occupies the processing resource of the client.

Such a system has another shortcoming in the form of the required decryption processing by the server of every character sent from the client. To the extent such information is non-confidential, the additional processing load on the server from the task of decrypting the information consumes processing capacity without providing a benefit. Moreover, the server typically has communication with multiple users. So, the additional processing load for each user multiplies the tasks to be performed by the server. Where the additional processing load from any one or more of the preceding tasks exceeds the immediately available processing power, then overall system performance is disadvantageously slowed. The required decryption of the non-confidential data in addition to the confidential data input by the user can undesirably create a bottleneck. Additional processing to further decrypt non-confidential information from the Web page itself such as description, text, graphics or the like can exacerbate the situation, disadvantageously increasing the bottleneck in the system.

To improve throughput, the Web site usually employs a server having increased processing power. However, the increased processing power of the server requires increased cost for the server. Where the increased processing power results from a requirement to decrypt non-confidential information, then the expense of providing the increased capacity represents a wasteful allocation of resources or funds for the system.

Thus, a need exists for increased efficiency in communication of confidential and non-confidential data.

SUMMARY OF THE INVENTION

Pursuant to the present invention, shortcomings of the existing art are overcome and additional advantageous are provided through the provision of communication of a message including a first datum with encryption and a second datum without encryption.

The invention in one embodiment encompasses a method of communicating data between a first computing device and a second computing device. A first datum of a message is communicated from the first computing device to the second computing device with encryption of the first datum. A second datum of the message is communicated from the first computing device to the second computing device without encryption of the second datum.

Another embodiment of the invention encompasses a data communication system. A first computing device communicates information to a second computing device responsive to a request from the second computing device to the first computing device. The information includes a procedure that causes the second computing device to select a first datum of a message for communication of the first datum from the second computing device to the first computing device with encryption and select a second datum of the message for communication of the second datum from the second computing device to the first computing device without encryption. The first computing device receives the first datum with encryption and the second datum without encryption and decrypts the first datum.

A further embodiment of the invention encompasses an article of manufacture. At least one computer usable medium has computer readable program code means embodied therein for causing communication of a first datum of a message with encryption of the first datum and communication of a second datum of the message without encryption of the second datum. There is provided computer readable program code means for causing a first computing device to communicate information to a second computing device responsive to a request from the second computing device to the first computing device. The information communicated from the first computing device includes a procedure that causes the second computing device to select the first datum of the message for encrypted communication of the first datum from the second computing device to the first computing device and select the second datum of the message for non-encrypted communication of the second datum from the second computing device to the first computing device. There is also provided computer readable program code means for causing the first computing device to decrypt the first datum of the message communicated with encryption from the second computing device to the first computing device. The second datum of the message is communicated from the second computing device to the first computing device without encryption of the second datum.

DETAILED DESCRIPTION

In accordance with the principles of the present invention, a first computing device communicates to a second computing device a first datum of a message with encryption of the first datum and a second datum of the message without encryption of the second datum.

Figure 1:
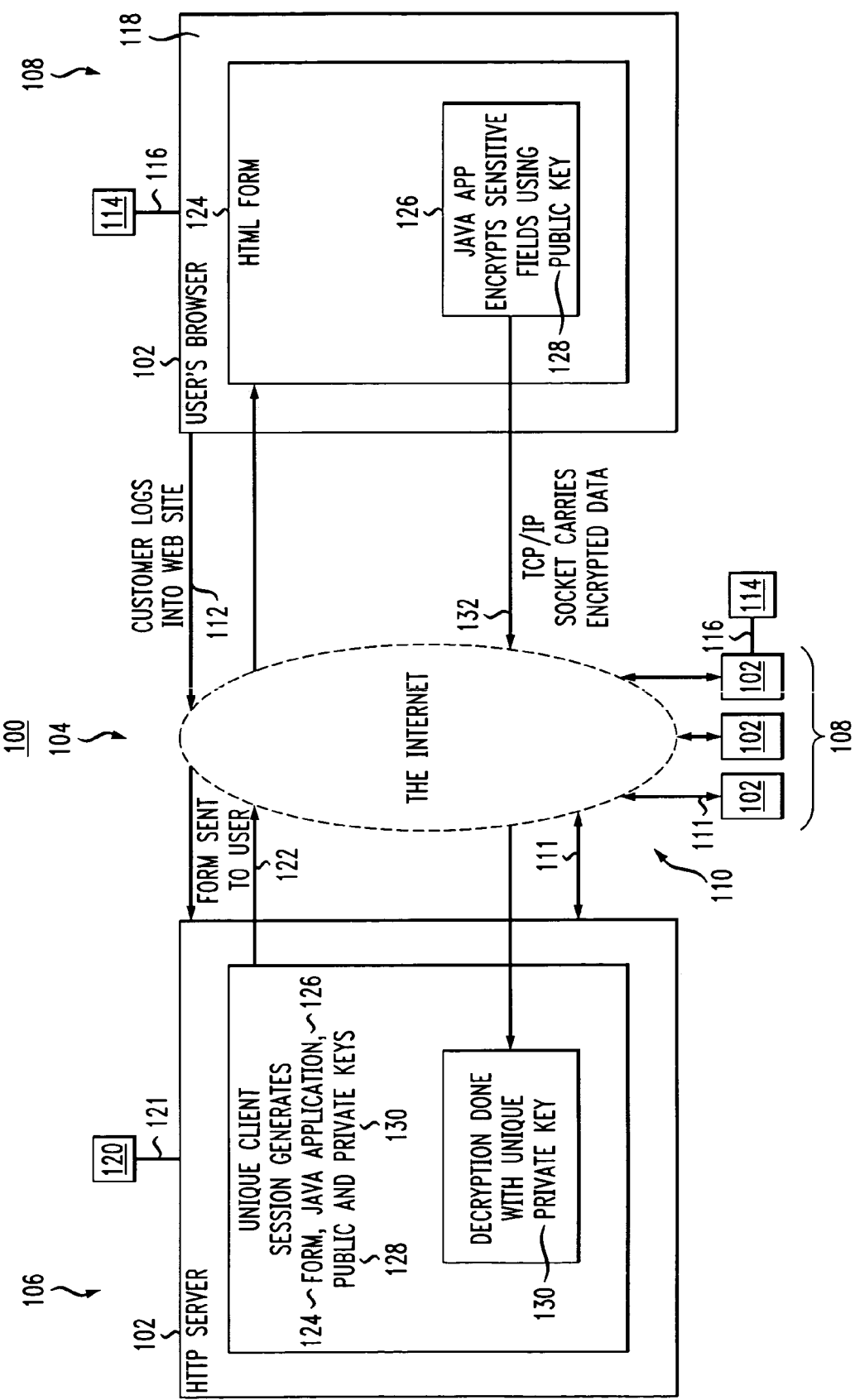
FIG. 1 is a functional block diagram of one example of a communication system including multiple computing devices interconnected by a network.

Referring to FIG. 1, communication system 100 includes a plurality of computing devices 102. Computing devices 102 are, for instance, interconnected by link 104. In one example, computing devices 102 include one or more instances of server system 106 and client system 108. Link 104 comprises, for example, network 110 interconnecting server system 106 and one or more instances of client system 108. For instance, server system 106 comprises a hypertext transfer protocol ("HTTP") server. As will be appreciated by those skilled in the art, server system 106 and/or client system 108 can include server as well as client capabilities, features and/or the like. In a further example, each of multiple instances of client system 108 can be connected to network 110 for communication with server system 106 and/or other instances of client system 108, as will be understood by those skilled in the art. In one example, network 110 comprises a local area network ("LAN") and/or the Internet. Network 110 includes for example, a plurality of paths or passages 111, which may be static or dynamic, for communication among a number of instances of server system 106 and/or client system 108.

Still referring to FIG. 1, STEPS 112, 122, and 132 represent exemplary communication between a client system 108 and a server system 106 such as across a passage 111 of network 110. For example, communication as part of STEPS 112, 122, and/or 132 can include any size and/or amount of information or data. For instance, a datum communicated as part of the information of STEPS 112, 122, and/or 132 can comprise, for example, one or more bits, digits, bytes, words, pages and/or the like.

Further referring to FIG. 1, one example of STEP 112 includes communication of information from client system 108 across network 110 to server system 106. User 114 employs link 116 to interface with client system 108. Client system 108 includes browser 118. For instance, the information of STEP 112 comprises a request from user 114. User 114 employs browser 118 to communicate the request as part of STEP 112. For example, user 114 employs link 116 to access browser 118 for logging into Web site 120, as described herein. Link 121 interconnects Web site 120 and server system 106.

Referring again to FIG. 1, STEP 122 includes server system 106 communicating across network 110 to client system 108. For example, STEP 122 includes server system 106 responding to the request from client system 108 as part of STEP 112. In response to the request from client system 108 in STEP 112, for example, server system 106 prepares or selects information for client system 108 such as Web page 124, procedure or embedded program 126, and first and second keys. For instance, the first and second keys allow security in communication such as through encryption and decryption of transmitted data, as in STEPS 122 and/or 132. In one example, the first and second keys comprise public key 128 and private key 130. For instance, embedded program 126, public key 128, and private key 130 comprise an encryption algorithm and matched keys based on RSA. Web page 124 comprises, for instance, hypertext markup language ("HTML"). In one example, embedded program 126 can be sent or transmitted with Web page 124. Embedded program 126 is implemented in, for example, a machine independent programming language such as Java, from Sun Microsystems. For instance, embedded program 126 is implemented with a Java applet. In one example, embedded program 126 employs lowest or substantially lowest common denominator Java. Embedded program 126 uses, for example, basic or the most basic Java utilities and a simple or very simple Java application to promote compatibility with multiple and various types of browser 118 on different instances of client system 108. As one advantage, this compatibility promotes avoidance of delays in communication which might otherwise arise in the event of incompatibilities such as among various browsers 118 and/or computing devices 102, as will be appreciated by those skilled in the art. In another example, embedded program 126 is implemented with ActiveX, from Microsoft Corporation.

Further referring to FIG. 1, one example of STEP 122 includes server system 106 communicating information to client system 108 comprising Web page 124. Server system 106 communicates Web page 124 across network 110 in STEP 122 as a response to the request from client system 108 in STEP 112. In one example, Web page 124 communicated to client system 108 includes embedded program 126. Embedded program 126 communicated to client system 108, in one example, employs public key 128.

Referring again to FIG. 1, client system 108 employs or runs embedded program 126 of Web page 124 communicated from server system 106 in STEP 122. Embedded program 126 employs public key 128 on client system 108 to encrypt confidential or sensitive data provided by user 114, as described herein. In one example, embedded program 126 advantageously encrypts confidential data provided by user 114 without encrypting non-confidential data provided by user 114.

Still referring to FIG. 1, STEP 132 includes client system 108 communicating information, for instance, a message, to server system 106. The message communicated from client system 108 to server system 106 comprises information input from user 114 to Web page 124 on client system 108. In one example, the information comprising the message includes data having a relation, such as by subject, matter, transaction, occurrence or the like.

Referring further to FIG. 1, STEPS 112, 122, and 132 in one example employ a same passage 111 of network 110 between client system 108 and server system 106. For instance, this passage 111 can cross and/or comprise the Internet and/or conform to a networking protocol such as transmission control protocol/Internet protocol ("TCP/IP"). In one example, STEPS 112, 122, and 132 are performed across a same TCP/IP socket comprising a passage 111. In a further example, any one of STEPS 112, 122, and/or 132 can comprise a single packet of a message, or a plurality of packets of a message, as will be appreciated by those skilled in the art.

Figure 2:
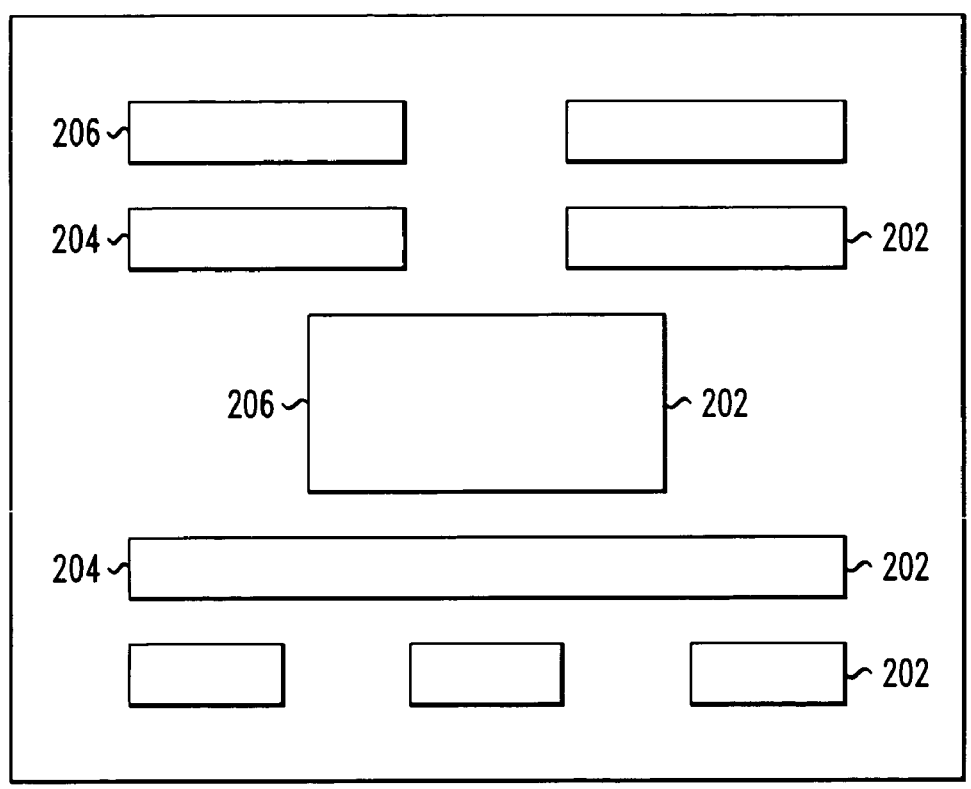
FIG. 2 is one example of a Web page for communication between a plurality of the multiple computing devices in the system of FIG. 1.

Turning to FIG. 2, Web page 124 in one example comprises a plurality of portions 202. For instance, portions 202 include a number of entry fields 204 and a number of presentation fields 206. For instance, one or more entry fields 204 allow user 114 (FIG. 1) to input characters or text. One or more presentation fields 206 comprise, for instance, a prompt, instruction, entertainment, direction, advertisement, announcement and/or the like. For example, one or more presentation fields 206 can comprise text and/or graphics to request and/or direct input of information by user 114 into one or more entry fields 204.

For illustrative purposes, a detailed description of exemplary operation of communication system 100 is presented with reference to FIGS. 1-2.

Referring to FIGS. 1-2, user 114 decides to apply for a credit card as a request in STEP 112. User 114 employs link 116 to use browser 118 on client system 108. Browser 118 allows user 114 to interface with client system 108 and employ server system 106 across network 110 to access Web site 120. In one example, Web site 120 provides an icon (not shown) that user 114 selects with a pointer (not shown)

controlled by a mouse (not shown). User 114 activates the icon by clicking a button (not shown) on the mouse. The activation of the icon by user 114 comprises a request from client system 108 to server system 106 as part of STEP 112, as will be appreciated by those skilled in the art.

Referring still to FIGS. 1-2, server system 106 receives the request from client system 108 as part of STEP 112. Since the request from client system 108 comprises a request for a credit card, server system 106 determines or knows that confidential information as well as non-confidential information will be communicated in STEP 132 across network 110 between client system 108 and server system 106. For instance, the confidential information comprises information about user 114 that user 114 wishes to share only with a company responsible for Web site 120. The company with which user 114 wishes to share the confidential information comprises a company with which user 114 wishes to pursue, for example, a commercial transaction or authorization such as an application for, or purchase by use of, a credit card. In addition, during STEP 132 user 114 wishes to keep the confidential information secret or private from any party other than the company responsible for Web site 120. To provide security for communication of the confidential information from user 114 across network 110, server system 106 in STEP 122 communicates embedded program 126 with public key 128 and Web page 124 to client system 108. User 114 employs link 116 to access Web page 124 on client system 108.

Again referring to FIGS. 1-2, in one example server system 106 employs a same key as public key 128 for each credit card request received from a number of client systems 108. For instance, the same key as public key 128 can be employed over a period such as one hour, one day, or one week. At the conclusion of the selected period, a different key as public key 128 can be employed until a conclusion of a subsequent period. In addition, server system 106 can use a same key as private key 130 coordinated with public key 128 for decryption of each communication from client system 108, for instance, occurring or commenced in the particular time period. As a further example, a same key can be employed as public key 128 for a certain number of requests received as part of a number of occurrences of STEP 112. A same basis would be employed to update a particular key for private key 130. In another example, server system 106 dynamically generates or provides a distinct set of keys as a matched key 128 and private key 130 for each user 114 transmitting or sending a credit card request, or for each such request sent, to server system 106 as part of STEP 112. In such a case, server system 106 could include a cookie (not shown) in the communication as part of STEP 122. Further, client system 108 could employ the cookie in the communication of STEP 132 to allow server system 106 to keep track of user 114. Also, the cookie returned in STEP 132 would allow server system 106 to match the particular private key 130 with the public key 128 for decryption of the confidential data from the corresponding user 114, as will be understood by those skilled in the art.

Further referring to FIGS. 1-2, a presentation field 206 may include text asking or directing user 114 to input an address of user 114 into a certain entry field 204. In one example, the data from the particular presentation field 206 and corresponding entry field 204 concerning the address of user 114 comprise non-confidential information.

Referring again to FIGS. 1-2, in one example embedded program 126 recognizes this particular presentation field 206 and corresponding entry field 204 concerning the address information of user 114 as comprising non-confidential data. So, embedded program 126 determines or selects that this address information of user 114 be treated as non-confidential data for communication as part of STEP 132. For STEP 132, embedded program 126 abstains from applying an encryption algorithm to the non-confidential data. Advantageously, a processor (not shown) on client system 108 need not perform encryption processing on the non-confidential data. The non-confidential data is communicated in STEP 132 without encryption. This non-encryption of the non-confidential data for communication in STEP 132 also provides a savings in processing to be performed by server system 106. Advantageously, a processor (not shown) on server system 106 need not perform decryption processing on the non-confidential data communicated in STEP 132. Desirably, the processors on server system 106 and client system 108 are therefore relieved or freed, for example, to perform other processing and/or be sized to require less processing power. As another example, the processor of server system 106 is advantageously allowed to handle other or additional STEPS 132 from different client systems 108 each demanding reduced processing power from server system 106 since the non-confidential data arrive at server system 106 without encryption while the confidential data arrives with encryption, as described herein.

Referring further to FIGS. 1-2, Web page 124 comprises a presentation field 206 including text that, for example, requests or directs user 114 to input a social security number of user 114 into a particular entry field 204. In one example, the social security number of user 114 input into the designated entry field 204 comprises confidential data. Optionally, the text in the presentation field 206 requesting or directing user 114 to input the social security number into entry field 204 can be considered to comprise confidential data. In one example, embedded program 126 represents or implements a design choice that selects or determines which one or more subsets of entry fields 204 and/or presentation fields 206 include confidential data. Advantageously, embedded program 126 employs an encryption algorithm to encrypt the confidential data from these one or more subsets of entry fields 204 and/or presentation fields 206 for communication as part of STEP 132. In addition, embedded program 126 advantageously abstains or refrains from encrypting the non-confidential data for communication as part of STEP 123.

Still referring to FIGS. 1-2, user 114 through link 116 inputs data into each of entry fields 204. As described herein, a subset of portions 202 comprise confidential data. After user 114 completes inputting data into entry fields 204, user 114 indicates a readiness to send the data such as by highlighting and activating or clicking an icon designated as a send button (not shown). In one example of STEP 132, the activation of the send button starts an encryption algorithm in embedded program 126. The activation of the encryption algorithm in embedded program 126 causes embedded program 126 to encrypt confidential data from the subset of portions 202 determined to be confidential and refrain from encrypting the remainder of portions 202 besides or except this subset of portions 202 selected or designated as comprising the confidential data.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of communication data between a first computing device and a second computing device, the method comprising:
   (a) a browser on the first computing device providing a Web page to a user, the Web page comprising at least first and second input fields for input from the user and at least a first presentation field associated with the at least first and second input fields and wherein the Web page displays, simultaneously to the user, the first and second input fields;
   (b) a program on the first computing device receiving a message from the user, wherein the message comprises at least a first and second datum input by the user into the at least first and second input fields, respectively, of the Web page, wherein the first datum is confidential to the user and the second datum is non-confidential to the user, and wherein the first datum comprises at least one of a credit card number and a social security number;
   (c) the program identifying that the first datum is confidential and the second datum is non-confidential;
   (d) the first computing device communicating, to the second computing device over an untrusted network, the first datum with encryption; and
   (e) the first computing device communicating, to the second computing device over the untrusted network, the second datum without encryption, wherein steps (d) and (e) occur at least substantially simultaneously.

2. The method of claim 1, wherein, in steps (d) and (e), the first and second data are included in a same packet.

3. The method of claim 1, wherein the Web page comprises hypertext markup language, wherein the first datum comprises the credit card number, wherein the second datum comprises information related to a purchase by the user, wherein the program is embedded in the Web page, and further comprising:
   loading the program on the first computing device after the Web page is received by the first computing device.

4. A computer readable medium comprising instructions to perform the steps of claim 1.

5. A system for communicating data between first and second computing devices, comprising:
   (a) a first computer device operable to communicate data over an untrusted network, the first computer device comprising:
      a user display, the display comprising, at one time, at least first and second input fields of a Web page for input from the user and at least a first presentation field associated with the at least first and second input fields;
      means for receiving input information from the user, wherein the information comprises at least a first and second datum input by the user into the at least first and second input fields, respectively, of the display, wherein the first datum is confidential to the user and the second datum is non-confidential to the user, wherein the first datum comprises at least one of a credit card number and a social security number; and
      means for identifying that the first datum is confidential and the second datum is non-confidential; and
   (b) a second communication device in communication with the first communication device, wherein the first computing device communicates, to the second computing device over the untrusted network, the first datum with encryption and the second datum without encryption.

6. The system of claim 5, wherein the first and second datum are communicated at least substantially simultaneously.

7. The system of claim 5, wherein the first and second data are included in a same packet.

8. The system of claim 5, wherein the Web page comprises hypertext markup language, wherein the first datum comprises the credit card number, wherein the second datum comprises information related to a purchase by the user, and wherein the means for identifying is in an applet received from the second communication device.

9. A method of communicating data between a first computing device and a second computing device, the method comprising the steps of:
   at a first computing device, receiving input information from one Web page displayed to a user, the input information comprising at least first and second datum corresponding respectively to at least first and second user input fields, wherein the first datum comprises at least one of a credit card number and a social security number;
   at the first computing device, a program determining which of the at least first and second user input fields contains confidential information, wherein the first datum is confidential to the user and the second datum is not confidential to the user;
   the first computing device communicating the first datum to a second computing device over an untrusted network with encryption of the first datum; and
   the first computing device communicating the second datum over the untrusted network to the second computing device without encryption of the second datum.

10. The method of claim 9, wherein the first and datum are communication in a message and wherein the step of communicating the first datum of the message with encryption of the first datum and the step of communicating the second datum of the message without encryption of the second datum comprise the step of communicating the first datum with encryption and the second datum without encryption in a same packet that comprises the message.

11. The method of claim 9, wherein the first and datum are communication in a message and wherein the step of communicating the first datum of the message with encryption of the first datum and the step of communicating the second datum of the message without encryption of the second datum comprise the steps of:
   communicating the first datum with encryption in a first packet of the message; and
   communicating the second datum without encryption in a second packet of the message different from the first packet of the message.

12. The method of claim 9, wherein the first and datum are communication in a message and wherein the step of communicating the first datum of the message with encryption of the first datum and the step of communicating the second datum of the message without encryption of the second datum comprise the step of employing a same path between the first computing device and the second computing device to communicate the first datum with encryption and the second datum without encryption.

13. The method of claim 12, wherein the step of employing the same path to communicate the first datum with encryption and the second datum without encryption comprises the step of employing a TCP/IP passage between the first computing device and the second computing device to communicate the first datum with encryption and the second datum without encryption.

14. The method of claim 9, wherein the first and datum are communication in a message and wherein the step of communicating the first datum of the message with encryption of the first datum comprises the step of employing a key to encrypt the first datum of the message for communication of the first datum from the first computing device to the second computing device with encryption of the first datum.

15. The method of claim 9, further comprising the step of communicating a key from the second computing device to the first computing device, and wherein the step of communicating the first datum of the message from the first computing device to the second computing device with encryption of the first datum comprises the step of employing the key to encrypt the first datum of the message for communication of the first datum from the first computing device to the second computing device.

16. The method of claim 15, wherein the key comprises a first key and further comprising the step of employing a second key to decrypt the first datum of the message after communication of the first datum from the first computing device to the second computing device with encryption of the first datum.

17. The method of claim 16, further comprising the step of selecting the first key and the second key to comprise matched keys for communication of the first datum of the message from the first computing device to the second computing device with security of the first datum.

18. The method of claim 9, wherein the Web page comprises hypertext markup language, wherein the first datum comprises the credit card number, wherein the second datum comprises information related to a purchase by the user, wherein the program is embedded in the Web page, and further comprising:
    loading the program on the first computing device after the Web page is received by the first computing device.

19. The method of claim 18, wherein the step of communicating the procedure from the second computing device to the first computing device comprises the step of selecting the procedure to comprise a procedure based on a machine independent Web protocol.

20. The method of claim 18, wherein the first and datum are communication in a message and wherein the step of communicating the first datum of the message from the first computing device to the second computing device with encryption of the first datum comprises the step of employing the procedure to select the first datum of the message for communication of the first datum from the first computing device to the second computing device with encryption of the first datum.

21. The method of claim 20, wherein the step of communicating the second datum of the message from the first computing device to the second computing device without encryption of the second datum comprises the step of employing the procedure to select the second datum of the message for communication of the second datum from the first computing device to the second computing device without encryption of the second datum.

22. An article of manufacture comprising at least one computer usable medium having computer readable program code operable to perform the steps of claim 9.

23. The method of claim 9, wherein the first datum is confidential information to a user and the second datum is non-confidential information to the user.

24. The method of claim 9, wherein the first and datum are communication in a message and further comprising:
    receiving the input information from a user, the input information comprising a plurality of input fields; and
    determining each input field comprising confidential information to the user and each input field comprising non-confidential information to the user, wherein the first datum is confidential information and the second datum is non-confidential information.

25. The method of claim 24, wherein the communicating steps comprise:
    encrypting the information in each of the input fields identified as comprising confidential information; and
    not encrypting the information in each of the input fields identified as comprising non-confidential information.

26. The method of claim 9, wherein the communicating steps occur at least substantially simultaneously.

27. A data communication system, comprising:
    a first computer device operable to communicate data over an untrusted network, the first computer device comprising:
        (a) a user display, the display comprising at least first and second input fields of a single, displayed Web page for input from the user and at least a first presentation field associated with the at least first and second input fields;
        (b) an input operable to receive input information from the user, wherein the information comprises at least a first and second datum input by the user into the at least first and second input fields, respectively, of the display, wherein the first datum is confidential to the user and the second datum is non-confidential to the user, and wherein the first datum comprises at least one of a credit card number and a social security number; and
        (c) a procedure operable to identify that the first datum is confidential and the second datum is non-confidential;
    wherein a second communication device is in communication with the first communication device and wherein the first computing device communicates, to the second computing device over the untrusted network, the first datum with encryption and the second datum without encryption.

28. The system of claim 27, wherein the first and datum are communication in a message and wherein the first computing device receives the first datum with encryption and the second datum without encryption in a same packet that comprises the message.

29. The system of claim 27, wherein the first and datum are communication in a message and wherein the first computing device receives the first datum with encryption in a first packet of the message, and wherein the first computing device receives the second datum without encryption in a second packet of the message different from the first packet of the message.

30. The system of claim 27, wherein the first and datum are communication in a message and wherein the first computing device employs a same path to receive from the second computing device, the first datum of the message with encryption and the second datum of the message without encryption.

31. The system of claim 30, wherein the same path comprises a TCP/IP passage between the first computing device and the second computing device.

32. The system of claim 27, wherein the first and datum are communication in a message and wherein the information communicated from the first computing device to the second computing device includes a key employed by the second computing device to encrypt the first datum of the message for communication of the first datum from the second computing device to the first computing device.

33. The system of claim 32, wherein the key comprises a first key, and wherein the first computing device employs a second key to decrypt the first datum of the message communicated from the second computing device to the first computing device with encryption of the first datum.

34. The system of claim 33, wherein the first computing device selects the first key and the second key to comprise matched keys for communication of the first datum of the message from the second computing device to the first computing device with security of the first datum.

35. The system of claim 27, wherein the first and datum are communication in a message and wherein the second computing device employs the procedure to encrypt the first datum for communication of the first datum of the message from the second computing device to the first computing device.

36. The system of claim 27, wherein the procedure is based on a machine independent Web protocol.

37. The system of claim 27, wherein the first and datum are communication in a message and wherein the procedure causes the second computing device to select the first datum for communication of the first datum of the message from the second computing device to the first computing device with encryption of the first datum.

38. The system of claim 37, wherein the procedure causes the second computing device to select the second datum for communication of the second datum of the message from the second computing device to the first computing device without encryption of the second datum.

39. The system of claim 27, wherein the Web page comprises hypertext markup language, wherein the first datum comprises the credit card number, wherein the second datum comprises information related to a purchase by the user, wherein the procedure is in an applet received from the second communication device.

40. The system of claim 27, wherein the first and datum are communication in a message, wherein the first computing device is operable to receive the input information from a user, the input information comprising a plurality of input fields, and determine each input field comprising confidential information to the user and each input field comprising non-confidential information to the user, wherein the first datum is confidential information and the second datum is non-confidential information.

41. The system of claim 40, wherein the first computing device encrypts the information in each of the input fields identified as comprising confidential information and does not encrypt the information in each of the input fields identified as comprising non-confidential information.

* * * * *